US012143565B2

(12) United States Patent
Wang et al.

(10) Patent No.: US 12,143,565 B2
(45) Date of Patent: *Nov. 12, 2024

(54) VIDEO CODING USING MULTI-RESOLUTION REFERENCE PICTURE MANAGEMENT

(71) Applicant: BEIJING DAJIA INTERNET INFORMATION TECHNOLOGY CO., LTD., Beijing (CN)

(72) Inventors: Xianglin Wang, San Diego, CA (US); Yi-Wen Chen, San Diego, CA (US); Yunfei Zheng, San Jose, CA (US); Xing Wen, San Jose, CA (US); Yucong Chen, Beijing (CN); Yue Huang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/566,965

(22) Filed: Dec. 31, 2021

(65) Prior Publication Data
US 2022/0124317 A1 Apr. 21, 2022

Related U.S. Application Data

(63) Continuation of application No. 16/706,675, filed on Dec. 6, 2019.
(Continued)

(51) Int. Cl.
H04N 19/105 (2014.01)
H04N 19/132 (2014.01)
(Continued)

(52) U.S. Cl.
CPC ......... *H04N 19/105* (2014.11); *H04N 19/132* (2014.11); *H04N 19/172* (2014.11);
(Continued)

(58) Field of Classification Search
CPC .. H04N 19/105; H04N 19/132; H04N 19/172; H04N 19/186; H04N 19/33; H04N 19/423; H04N 19/70
(Continued)

(56) References Cited

U.S. PATENT DOCUMENTS 6,078,617 A * 6/2000 Nakagawa ............. F16B 31/00
375/240
6,584,154 B1 * 6/2003 Wu ....................... H04N 19/117
375/E7.113
(Continued)

FOREIGN PATENT DOCUMENTS

CN 104885459 A 9/2015
EP 3166314 A1 5/2017
(Continued)

OTHER PUBLICATIONS

Sharp Labs of America, Inc., Misra, et al., "AHG18/21: Absolute Signaling For Resolution Switching", Input Document to JCT-VC, Joint Collaborative Team on Video Coding (JCT-VC) of ITU-T SG16 WP3 and ISO/IEC JTC1/SC29/WG11, Document JCTVC-G715, 7th Meeting: Geneva CH, Nov. 21-30, 2011, (7p).
(Continued)

*Primary Examiner* — Tung T Vo
(74) *Attorney, Agent, or Firm* — Arch & Lake LLP

(57) ABSTRACT

Video coding methods and apparatuses are provided. A set of two or more pictures is coded. The set includes at least a first picture coded with a first spatial resolution, and a second picture coded with a second spatial resolution different from the first spatial resolution. The set of two or more
(Continued)

pictures is stored in a decoded picture buffer based on corresponding spatial resolutions. The set of two or more pictures stored in the decoded picture buffer is used as a set of reference pictures for coding one or more successive pictures subsequent to the set of two or more pictures. The set of two or more pictures is incorporated into a reference picture list that contains pictures with at least two different spatial resolutions.

7 Claims, 3 Drawing Sheets

Related U.S. Application Data

(60) Provisional application No. 62/776,997, filed on Dec. 7, 2018.

(51) Int. Cl.
  *H04N 19/172* (2014.01)
  *H04N 19/186* (2014.01)
  *H04N 19/33* (2014.01)
  *H04N 19/423* (2014.01)

(52) U.S. Cl.
  CPC ........... *H04N 19/186* (2014.11); *H04N 19/33* (2014.11); *H04N 19/423* (2014.11)

(58) Field of Classification Search
  USPC ........................................................ 375/240
  See application file for complete search history.

(56) References Cited

U.S. PATENT DOCUMENTS

| | | | | |
|---|---|---|---|---|
| 8,275,036 | B2* | 9/2012 | Etoh | H04N 9/8042 |
| | | | | 375/240.01 |
| 8,599,214 | B1* | 12/2013 | Dall | H04N 1/64 |
| | | | | 345/601 |
| 10,390,031 | B2* | 8/2019 | Lee | H04N 19/70 |
| 11,870,945 | B2* | 1/2024 | Katsavounidis | H04N 19/85 |
| 2002/0041632 | A1* | 4/2002 | Sato | H04N 19/80 |
| | | | | 375/240.25 |
| 2007/0036227 | A1* | 2/2007 | Ishtiaq | H04N 19/172 |
| | | | | 375/240.26 |
| 2007/0071104 | A1* | 3/2007 | Kondo | H04N 19/46 |
| | | | | 375/240.21 |
| 2012/0269275 | A1* | 10/2012 | Hannuksela | H04N 19/61 |
| | | | | 375/240.25 |
| 2013/0038686 | A1* | 2/2013 | Chen | H04N 19/176 |
| | | | | 348/E13.001 |
| 2013/0089154 | A1* | 4/2013 | Chen | H04N 19/573 |
| | | | | 375/240.01 |
| 2014/0016710 | A1* | 1/2014 | Rodriguez | H04N 21/23424 |
| | | | | 375/240.25 |
| 2014/0028797 | A1* | 1/2014 | Hattori | H04N 19/52 |
| | | | | 348/43 |
| 2014/0119671 | A1* | 5/2014 | Lim | H04N 19/176 |
| | | | | 382/233 |
| 2014/0192895 | A1 | 7/2014 | Chen et al. | |
| 2014/0301453 | A1* | 10/2014 | Deshpande | H04N 19/159 |
| | | | | 375/240.12 |
| 2015/0016500 | A1* | 1/2015 | Seregin | H04N 19/30 |
| | | | | 375/240.02 |
| 2015/0023419 | A1* | 1/2015 | Chen | H04N 19/105 |
| | | | | 375/240.12 |
| 2015/0146794 | A1* | 5/2015 | Hoang | H04N 19/91 |
| | | | | 375/240.24 |
| 2015/0189298 | A1* | 7/2015 | Ye | H04N 19/174 |
| | | | | 375/240.02 |
| 2015/0195545 | A1* | 7/2015 | Wang | H04N 19/172 |
| | | | | 375/240.02 |
| 2015/0304671 | A1* | 10/2015 | Deshpande | H04N 19/44 |
| | | | | 375/240.12 |
| 2015/0319453 | A1* | 11/2015 | Kang | H04N 19/187 |
| | | | | 375/240.12 |
| 2016/0065976 | A1* | 3/2016 | He | H04N 19/59 |
| | | | | 375/240.12 |
| 2016/0165242 | A1* | 6/2016 | Lee | H04N 19/187 |
| | | | | 375/240.08 |
| 2016/0173889 | A1* | 6/2016 | Lee | H04N 19/503 |
| | | | | 375/240.12 |
| 2016/0189416 | A1* | 6/2016 | Naguib | H04W 4/02 |
| | | | | 345/441 |
| 2016/0191931 | A1* | 6/2016 | Hannuksela | H04N 19/70 |
| | | | | 375/240.12 |
| 2016/0381393 | A1* | 12/2016 | Tsukuba | H04N 19/30 |
| | | | | 375/240.12 |
| 2017/0230685 | A1* | 8/2017 | Gisquet | H04N 19/593 |
| 2017/0272750 | A1* | 9/2017 | An | H04N 19/96 |
| 2017/0347109 | A1* | 11/2017 | Hendry | H04N 19/96 |
| 2018/0077426 | A1* | 3/2018 | Zhang | H04N 19/176 |
| 2018/0278958 | A1* | 9/2018 | Hsiang | H04N 19/60 |
| 2019/0297339 | A1* | 9/2019 | Hannuksela | H04N 19/59 |
| 2021/0084291 | A1* | 3/2021 | Chang | H04N 19/105 |

FOREIGN PATENT DOCUMENTS

| | | |
|---|---|---|
| JP | H10341443 A | 12/1998 |
| JP | 2014529204 A | 10/2014 |
| JP | 2015522988 A | 8/2015 |

OTHER PUBLICATIONS

First Office Action issued in Chinese Application No. 202111280396.6 dated Sep. 28, 2023 with English translation, (14p).

* cited by examiner

VIDEO CODING USING MULTI-RESOLUTION REFERENCE PICTURE MANAGEMENT

CROSS-REFERENCE TO RELATED APPLICATIONS

This application is a continuation application that claims priority to U.S. patent application Ser. No. 16/706,675 filed on Dec. 6, 2019, which claims priority to U.S. provisional patent application Ser. No. 62/776,997 filed on Dec. 7, 2018. The entire disclosures of the aforementioned applications are incorporated herein by reference in their entireties for all purposes.

FIELD

The present disclosure relates generally to video coding and compression. More specifically, this disclosure relates to systems and methods for performing video coding using reference picture management.

BACKGROUND

This section provides background information related to the present disclosure. The information contained within this section should not necessarily be construed as prior art.

Any of various video coding techniques may be used to compress video data. Video coding can be performed according to one or more video coding standards. Some illustrative video coding standards include versatile video coding (VVC), joint exploration test model (JEM), high-efficiency video coding (H.265/HEVC), advanced video coding (H.264/AVC), and moving picture experts group (MPEG) coding. Video coding generally utilizes predictive methods (e.g., inter-prediction, intra-prediction, or the like) that take advantage of redundancy inherent in video images or sequences. One goal of video coding techniques is to compress video data into a form that uses a lower bit rate, while avoiding or minimizing degradations to video quality.

Pursuant to many video codec specifications, pictures saved in a decoded picture buffer (DPB) need to be identified and managed for multiple purposes. For example, these pictures may be used as reference pictures to perform inter prediction. Additionally or alternatively, these pictures may serve as output pictures for display. Meanwhile, information associated with these pictures may also be used in operations like scaling of motion vectors (MVs) in temporal motion vector derivation, and/or scaling of sample values in weighted prediction, etc.

SUMMARY

This section provides a general summary of the disclosure, and is not a comprehensive disclosure of its full scope or all of its features.

According to a first aspect of the present disclosure, a video coding method is performed at a computing device having one or more processors and memory storing a plurality of programs to be executed by the one or more processors. The method includes coding a set of two or more pictures, the set comprising at least a first picture coded with a first spatial resolution, and a second picture coded with a second spatial resolution different from the first spatial resolution. The set of two or more pictures is stored in a decoded picture buffer operatively coupled to a decoder. The set of two or more pictures is stored in the decoded picture buffer based on their corresponding picture resolutions. The set of two or more pictures stored in the decoded picture buffer is used as a set of reference pictures for coding one or more successive pictures subsequent to the set of two or more pictures. The set of two or more pictures is incorporated into a reference picture list that contains pictures with at least two different spatial resolutions.

According to a second aspect of the present disclosure, a video coding apparatus is provided. The apparatus includes a coder configured for coding a set of two or more pictures. The set includes at least a first picture coded with a first spatial resolution, and a second picture coded with a second spatial resolution different from the first spatial resolution. The set of two or more pictures is stored in a decoded picture buffer operatively coupled to a decoder. The set of two or more pictures is stored in the decoded picture buffer based on their corresponding picture resolutions. The decoded picture buffer comprises a computer-readable storage device configured for storing the set of two or more pictures. The set of two or more pictures is stored in the decoded picture buffer based upon the first and second spatial resolutions. The set of two or more pictures is stored in a decoded picture buffer operatively coupled to a decoder. The set of two or more pictures is stored in the decoded picture buffer based on their corresponding picture resolutions. The set of two or more pictures stored in the decoded picture buffer is used as a set of reference pictures for coding one or more successive pictures subsequent to the set of two or more pictures. The set of two or more pictures is incorporated into a reference picture list that contains pictures with at least two different spatial resolutions.

BRIEF DESCRIPTION OF THE DRAWINGS

Hereinafter, sets of illustrative, non-limiting embodiments of the present disclosure will be described in conjunction with the accompanying drawings. Variations of structure, method, or functionality may be implemented by those of ordinary skill in the relevant art based on the examples presented herein, and such variations are all contained within the scope of the present disclosure. In cases where no conflict is present, the teachings of different embodiments may, but need not, be combined with one another.

DETAILED DESCRIPTION

The terms used in the present disclosure are directed to illustrating particular examples, rather than to limit the present disclosure. The singular forms "a" "an" and "the" as used in the present disclosure as well as the appended claims also refer to plural forms unless other meanings are definitely contained in the context. It should be appreciated that the term "and/or" as used herein refers to any or all possible combinations of one or more associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to," depending on the context.

Reference throughout this specification to "one embodiment," "an embodiment," "another embodiment," or the like in the singular or plural means that one or more particular features, structures, or characteristics described in connection with an embodiment are included in at least one embodiment of the present disclosure. Thus, the appearances of the phrases "in one embodiment" or "in an embodiment," "in another embodiment," or the like in the singular or plural in various places throughout this specification are not necessarily all referring to the same embodiment. Furthermore, the particular features, structures, or characteristics in one or more embodiments may be combined in any suitable manner.

Conceptually, many video coding standards are similar, including those previously mentioned in the Background section. For example, virtually all video coding standards use block-based processing, and share similar video coding block diagrams to achieve video compression.

Figure 1:
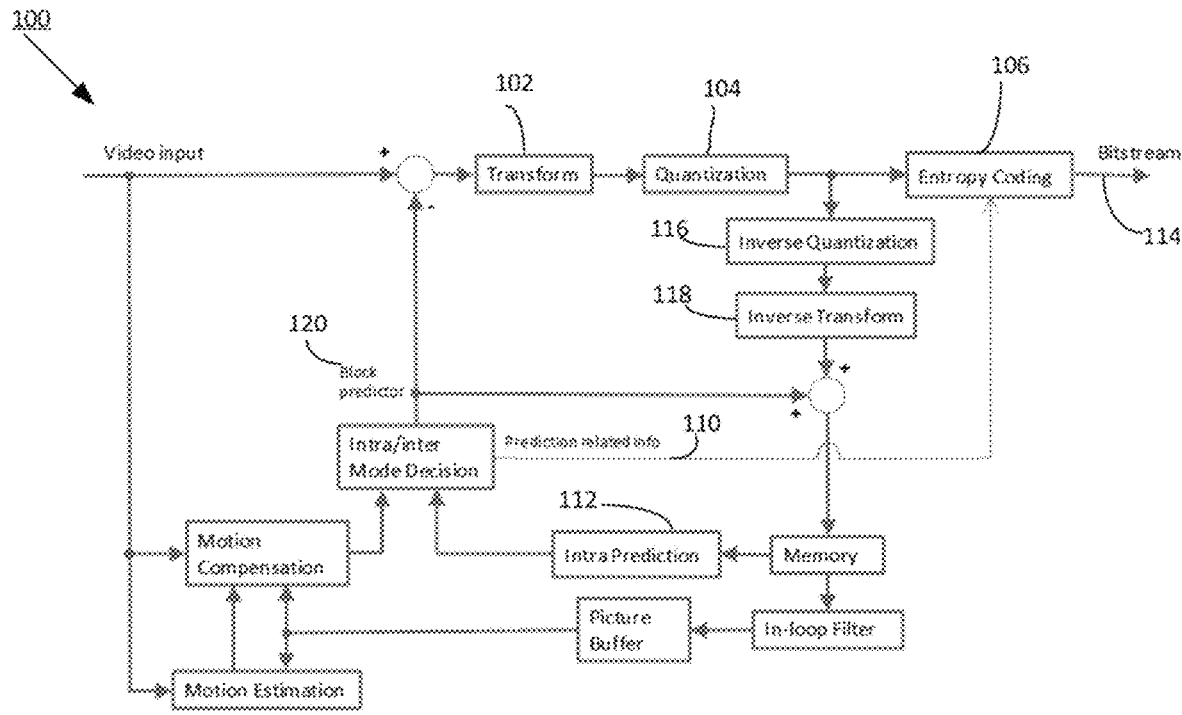
FIG. 1 is a block diagram setting forth an illustrative encoder which may be used in conjunction with many video coding standards.

FIG. 1 shows a block diagram of an illustrative encoder 100 which may be used in conjunction with many video coding standards. In the encoder 100, a video frame is partitioned into a plurality of blocks for processing. For each given video block, a prediction is formed based on either an inter prediction approach or an intra prediction approach. In inter prediction, one or more predictors are formed through motion estimation and motion compensation, based on pixels from previously reconstructed frames. In intra prediction, predictors are formed based on reconstructed pixels in a current frame. Through mode decision, a best predictor may be chosen to predict a current block.

A prediction residual, representing the difference between a current block and its predictor, is sent to a transform 102 module. Transform coefficients are then sent from the transform 102 module to a quantization 104 module for entropy reduction. Quantized coefficients are then fed to an entropy coding 106 module to generate a compressed video bitstream. As shown in FIG. 1, prediction-related information 110 from an inter prediction module and/or an intra prediction 112 module, such as block partition info, motion vectors, reference picture index, and intra prediction mode, etc., are also fed through the entropy coding 106 module and saved into a compressed video bitstream 114.

In the encoder 100, decoder-related modules are also needed in order to reconstruct pixels for the purpose of prediction. First, a prediction residual is reconstructed through an inverse quantization 116 block and an inverse transform 118 module. This reconstructed prediction residual is combined with a block predictor 120 to generate un-filtered reconstructed pixels for a current block.

To improve coding efficiency and visual quality, an in-loop filter is commonly used. For example, a deblocking filter is available in AVC, HEVC as well as the current version of VVC. In HEVC, an additional in-loop filter called SAO (sample adaptive offset) is defined to further improve coding efficiency. In the now-current version of the VVC standard, yet another in-loop filter called ALF (adaptive loop filter) is being actively investigated, and it has a good chance of being included in the final standard.

These in-loop filter operations are optional. Performing these operations helps to improve coding efficiency and visual quality. They may also be turned off as a decision rendered by the encoder 100 to save computational complexity.

It should be noted that intra prediction is usually based on unfiltered reconstructed pixels, while inter prediction is based on filtered reconstructed pixels if these filter options are turned on by the encoder 100.

Figure 2:
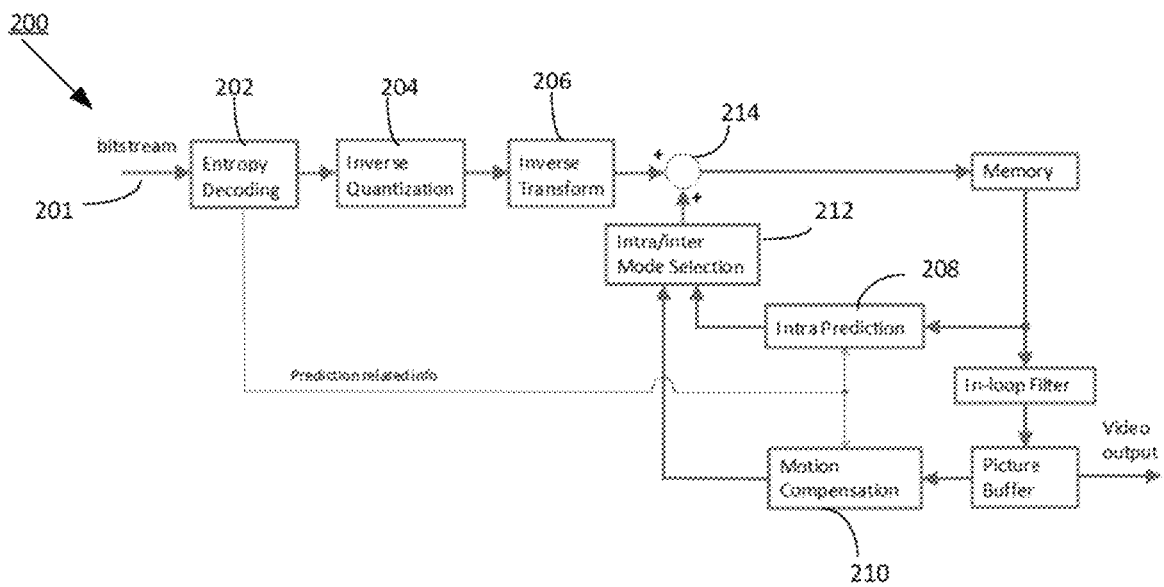
FIG. 2 is a block diagram setting forth an illustrative decoder which may be used in conjunction with many video coding standards.

FIG. 2 is a block diagram setting forth an illustrative decoder 200 which may be used in conjunction with many video coding standards. This decoder 200 is similar to the reconstruction-related section residing in the encoder 100 of FIG. 1. In the decoder 200 (FIG. 2), an incoming video bitstream 201 is first decoded through an entropy decoding 202 module to derive quantized coefficient levels and prediction-related information. The quantized coefficient levels are then processed through an inverse quantization 204 block and an inverse transform 206 module to obtain a reconstructed prediction residual. A block predictor mechanism, implemented in an intra/inter mode selector 212 block, is configured to perform either an intra prediction 208 procedure, or a motion compensation 210 process, based on decoded prediction information. A set of unfiltered reconstructed pixels are obtained by summing up the reconstructed prediction residual from the inverse transform 206 module and a predictive output generated by the block predictor mechanism, using a summer 214. In situations where an in-loop filter is turned on, a filtering operations is performed on these reconstructed pixels to derive the final reconstructed video for output.

Parameter sets were introduced in the H.264/AVC video coding standard because of the devastating effects that result from the loss of certain header information. This header information may be present in the form of a sequence header, and/or a picture header. For example, in many video coding applications, a picture may be partitioned into multiple segments such as slices, with each segment transported in its own transport unit (e.g. RTP packet). Usually the aforementioned header information is transported together with the first segment of a picture. In this case, the loss of the first packet of a picture may lead to a completely incorrect picture, due to the absence of this header data.

Figure 3:
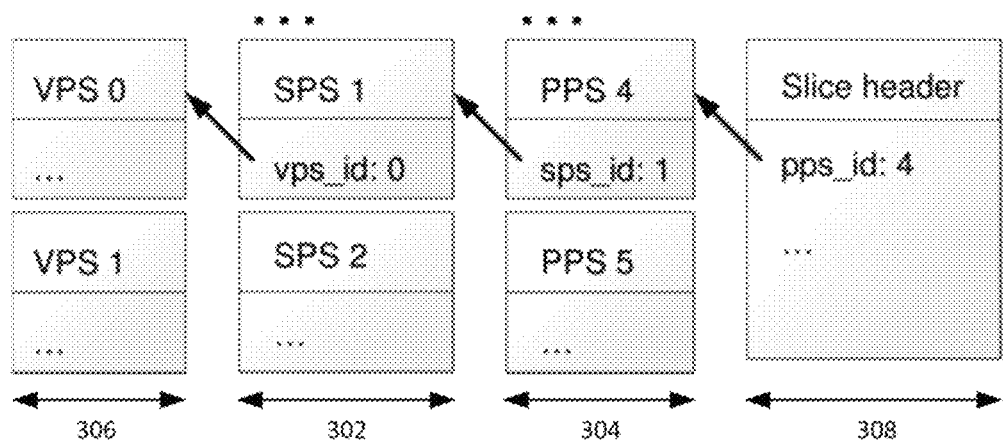
FIG. 3 is an example of parameter sets which may be used in conjunction with many video coding standards.

Parameter sets can be either part of the video bitstream (FIG. 1, 114, or FIG. 2, 201), or can be received by a decoder through other means such as an out-of-band transmission using a reliable channel, or hard coding in the encoder 100 (FIG. 1) and decoder 200 (FIG. 2). With reference to FIG. 3, parameter sets 300 may each contain different types of data with different scopes. For example, a sequence parameter set (SPS) 302 is defined to carry video sequence level information. A picture parameter set (PPS) 304 is also defined to carry picture level information. A parameter set contains an identification, which can be referenced from a slice header 308, directly or indirectly.

In HEVC, another type of parameter set called video parameter set (VPS) 306 was introduced to convey information that is applicable to multiple layers as well as sub-layers, to support cases with capability exchange and session negotiation. Each layer of a given video sequence, regardless of whether they have the same or different SPSs 302, refer to the same VPS 306.

The VPS 306 conveys information including: 1) common syntax elements shared by multiple layers or operation points, in order to avoid unnecessary duplications; 2) essential information of operation points needed for session negotiation, e.g., profile and level; and 3) other operation point-specific information, which doesn't belong to a single SPS 302, e.g., hypothetical reference decoder (HRD) parameters for layers or sub-layers. H.264/AVC does not have a comparable parameter set, and as a result information listed above usually have to be repeated in each SPS 302.

As shown in FIG. 3, the slice header 308 may refer to the PPS 304 through an identifier pps_id. Likewise, the PPS 304 may refer to the SPS 302 through an identifier sps_id, and the SPS may refer to the VPS through an identifier vps_id.

For inter-prediction, a motion model is defined to describe how to form a prediction block from a given reference picture.

In H.265/HEVC, H.264/AVC and prior video coding standards, only a translational motion model is defined and used for block-based motion compensation (MC). Based on this model, a reference pixel position $(x_r, y_r)$ can be derived as:

$$x_r = x + a$$

$$y_r = y + b$$

wherein (x, y) is the location if a current pixel. Parameters a and b are the horizontal and vertical components of a motion vector (a, b). Such a motion model is simple, and it cannot be used to model non-translational movement such as rotation, zooming or shear mapping, etc.

To achieve more efficient inter-prediction, more complex affine motion models are used in the latest VVC standard. Currently both 4-parameter and 6-parameter affine models are supported. The general 6-parameter affine model can be expressed as:

$$x_r = a*x + b*y + c$$

$$y_r = d*x + e*y + f$$

Wherein (a, b, c, d, e, f) are parameters to be determined and transmitted from encoder to decoder.

As a simplification, a 4-parameter affine model shown in the following is also supported in VVC to classify motions that are limited to a combination of just rotation, zooming and translation.

$$x_r = a*x + b*y + c$$

$$y_r = -b*x + a*y + f$$

Although the 4-parameter affine model is less generic than the 6-parameter affine model, it has less parameters to be coded and transmitted. In case motion is limited to rotation, zooming and translation, the 4-parameter affine model is usually preferable from a rate-distortion (RD) point of view.

In HEVC, motion vector of a current block may be predicted using a motion vector in one of its reference pictures. Such motion vector predictor is called temporal motion vector predictor (TMVP). A set of procedures are defined in HEVC to derive the TMVP for a given current block.

Particularly, in the derivation of this TMVP, a scaled motion vector is derived from MVs of the collocated picture, which is a previously coded picture in a reference picture list. In the derivation of the TMVP, an explicit flag in slice header (collocated from 10 flag) is firstly sent to the decoder to indicate whether the collocated picture is selected from a first reference picture list called list 0, versus a second reference picture list called list 1. In the following description of the disclosure, for simplicity, list 0 is also referred to as L0; likewise, list 1 is also referred to as L1. A collocated reference index (collocated_ref_idx) is further sent to indicate which picture in that list is selected as the collocated picture for deriving the TMVP. The L0 and L1 MVs of the temporal motion candidate is derived independently according to a predefined order for the MVs of different lists in the collocated blocks of the collocated pictures as shown in Table 1.

Table 1 shows an example algorithm to derive the temporal MV from the collocated block for TMVP in HEVC.

TABLE 1

When deriving the LX MV (X could be 0 or 1) of the temporal motion candidate, the LY MV (Y could be 0 or 1) of the collocated block is selected to derive the LX MV of the temporal motion candidate for the current block. The selected LY MV of the collocated block is then scaled according to the POC distances as described in the following paragraph.
If current picture has no backward prediction (which means there are no reference pictures have larger POC then current picture)
  LX MV of the collocated block is first selected. If the LX MV is not available, the L(1−X) is then selected.
Otherwise (current picture has backward prediction)
  LN MV of the collocated block is first selected. The N is set to the 1−cloolcated picture list (0 or 1).
  If the LN MV is not available, the L(1−N) is then selected.

Figure 4:
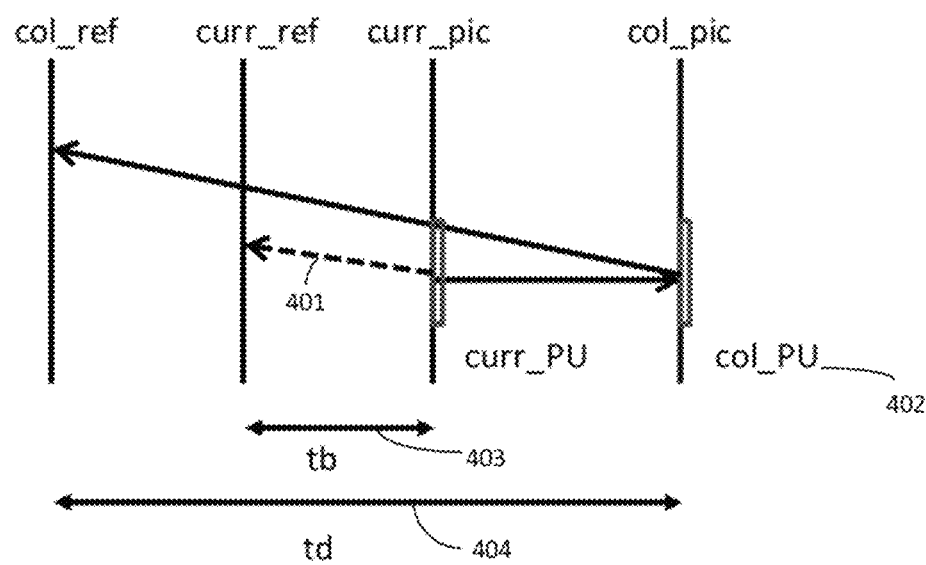
FIG. 4 is an illustration of motion vector scaling for deriving a temporal motion vector predictor (TVMP).

FIG. 4 is an illustration of a motion vector scaling procedure for deriving a temporal motion vector predictor (TVMP). The scaled motion vector for deriving TMVP is obtained as illustrated by a dotted line 401, which is scaled from a selected motion vector of a co-located prediction unit (PU) 402 using a set of picture order count (POC) distances tb 403 and td 404, where tb 403 is defined to be the a POC difference (also called a POC distance) between the reference picture of the current picture and the current picture, and td 404 is defined to be a POC difference between the reference picture of the co-located picture and the co-located picture. The reference picture index of a temporal merge candidate is set equal to zero. A practical realization of the scaling process is described in the HEVC specification. For a B-slice, two motion vectors are obtained. A first motion vector is for a reference picture list 0, and a second motion vector is for a reference picture list 1. The first and second motion vectors are combined to construct a bi-predictive TMVP.

As explained in previous sections, previously decoded/reconstructed pictures are saved in the decoded picture buffer (DPB). These pictures are managed based on certain rules so that they are available when needed and permanently removed from the DPB when no longer needed. Pictures in the DPB are used for multiple purposes, such as being used as reference pictures for inter prediction, and/or being output for display. They also provide information for motion vector scaling in deriving the temporal motion vector predictor (TMVP), and for sample value scaling in weighted prediction.

In both AVC and HEVC, pictures saved in the DPB are managed through a decoded reference picture marking process to determine if a picture is still used as a reference picture for coding successive pictures in decoding order, and/or if the picture is needed for output (or display). If a picture is not needed in either case, it is removed from the DPB and the corresponding memory space may be used for other pictures. In both standards, reference pictures are classified into two types: short-term reference picture and long-term reference picture.

The reference picture marking process is achieved through different mechanisms in AVC versus HEVC. In H.264/AVC, there are two mechanisms for decoded reference picture marking: the implicit sliding window process and the explicit memory management control operation (MMCO) process. The sliding window process marks a short-term reference picture as "unused for reference" when the number of reference frames is equal to a given maximum number (max_num_ref_frames) defined in SPS. The short-term reference pictures are stored in a first-in, first-out manner so that the most recently decoded short-term pictures are kept in the DPB.

The explicit MMCO process may include multiple MMCO commands. An MMCO command may mark one or more short-term or long-term reference picture as "unused for reference," mark all the pictures as "unused for reference," or mark the current reference picture or an existing short-term reference picture as long-term, and assign a long-term reference picture index to that long-term reference picture.

In H.265/HEVC, a completely different approach for reference picture management, through reference picture set (RPS), was introduced. For each particular slice, a RPS defines a complete set of the reference pictures that are used by the current picture or any subsequent picture. This set of reference pictures are all to be kept in the DPB. Unlike the mechanisms in H.264/AVC, with the RPS concept there is no need of information from earlier pictures in decoding order in order to maintain the correct status of reference pictures in the DPB.

It may be desirable to change the video resolution of a bitstream in order to accommodate temporary variations in the available bandwidth of a communication channel. This can be achieved either through simulcast or scalable video coding.

In case of simulcast, bitstreams for the same video but with different spatial resolutions may be generated separately and sent simultaneously in a broadcast manner. A receiving device may adaptively choose between the bitstreams at different resolutions based on the bandwidth of the receiving device. Such a resolution switch usually occurs at the position of a key picture (e.g. an IDR picture) which can serve as a random-access point.

In scalable video coding, bitstreams for the same video but with different spatial resolutions are generated jointly in a layered manner, with each layer corresponding to a different video resolution. Through such joint coding, certain correlation among these different resolution videos can be further exploited to reduce bitrate.

Figure 5:
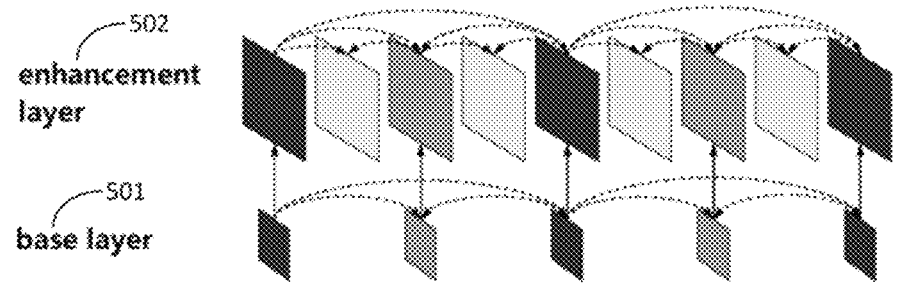
FIG. 5 shows an example of a scalable video coding structure.

FIG. 5 shows an example of a scalable video coding structure. In this example, two layers are present, which may be respectively referred to as a base layer 501 and an enhancement layer 502. In this example, the base layer 501 has both a lower spatial resolution and a lower temporal resolution than the enhancement layer 502. Compared to simulcast, inter-layer prediction (which is indicated by vertical arrows) may be supported to improve the enhancement layer 502 coding efficiency.

According to H.264/AVC's scalable video coding profile, any of several items can be used for inter-layer prediction from a collocated base layer 501 block. These items include using reconstructed pixels in intra-predicted areas, motion vectors, and/or block texture prediction residuals. In addition, these items from the collocated base layer 501 block need to be appropriately up-sampled and/or scaled when the base layer 501 and the enhancement layer 502 have different spatial resolutions. In this case, additional buffers may be needed to store the up-sampled/scaled intermediate data. Except for any additional buffers needed for inter-layer prediction, each layer has its own DPB.

As in the case of simulcast, bitstream switching from a lower spatial resolution to higher spatial resolution in scalable video coding may occur at the position of a key picture (e.g. an IDR picture) which can serve as a random-access point. Since the base layer 501 is always needed, switching from the enhancement layer 502 to the base layer 501 can occur at any picture location.

AOMedia Video 1 (AV1) is an open, royalty-free video coding format developed by the Alliance for Open Media (AOMedia), a consortium of firms from the semiconductor industry, video on demand providers, and web browser developers, founded in 2015.

In AV1, a feature called "frame super-resolution" is supported. According to this coding mode, a picture may be coded at lower spatial resolution and then super-resolved normatively in-loop to full resolution before updating a set of reference buffers. Such methods are known to offer perceptual advantages at very low bit-rates. To keep operations computationally tractable, the super-resolving process is decomposed into linear upscaling followed by applying the loop restoration tool based on a Wiener filter at a higher spatial resolution. Further, in order to enable a cost-effective hardware implementation with no overheads in line buffers, the upscaling/downscaling is constrained to operate only horizontally.

In existing video coding standards such as H.264/AVC and H.265/HEVC, a video is coded with a constant spatial resolution. In situations where this spatial resolution needs to be reduced to accommodate lower bit-rate scenarios and/or lower available bandwidths, a picture that can support random access (e.g. an IDR picture) is needed, along with new parameter set information (e.g. SPS, PPS, etc.) to be signaled together with the IDR picture. A problem with this mechanism is that sending an IDR picture is usually very costly since the picture is intra-coded. If a lower bitrate is forced upon that IDR picture, its visual quality may significantly suffer.

With AVC and/or HEVC's scalable extension profile, spatial resolution may be reduced by just keeping the base layer 501 picture bitstream to accommodate lower bit-rate scenarios. However, scalable video coding involves multi-layers. Its coding efficiency is usually not as efficient as coding a single layer. Decoder complexity is higher because multi-layer decoding (and in some cases multi-layer motion compensation) must be supported. Such extra complexity at decoder side is very undesirable in practice.

In AV1, such a case is much better supported through the coding mode of frame super-resolution. In this case, the frame resolution reduction can occur at any given picture location, including inter-predicted pictures. However, it does require a frame upscaling process followed by a super-resolving process before saving a reconstructed picture into DPB for future use, to make sure pictures in DPB all have the same spatial resolution.

According to the present disclosure, pictures may be coded with different spatial resolutions at any picture location. A change in spatial resolution can occur at any picture location, and does not have to occur at a picture that supports random access (e.g. an IDR picture). In addition, there is no upscaling process and super-revolving process needed to scale a reconstructed picture back to the original video resolution. Instead, reconstructed pictures are directly saved into the DPB regardless at what picture resolution they are coded.

The picture resolution downgrade is not limited to the horizontal direction. It can occur in both the horizontal and vertical directions.

Figure 6:
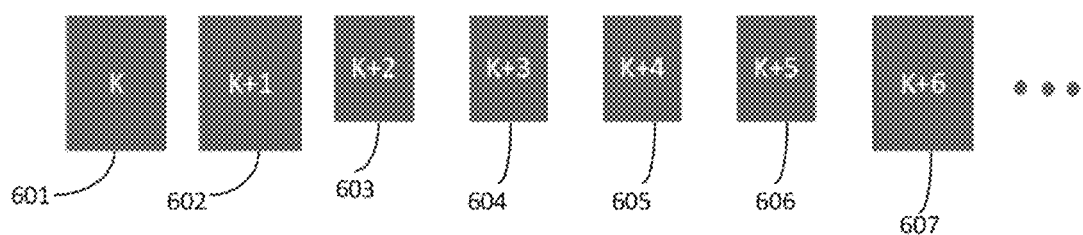
FIG. 6 illustrates a set of pictures that are coded at two different spatial resolutions.

FIG. 6 illustrates a set of pictures that are coded at two different spatial resolutions. For example, based on the teachings of the present disclosure, the DPB buffer may contain pictures with at least two different spatial resolutions. As shown in FIG. 6, assuming pictures are coded according to their temporal order of K, K+1, K+6 . . . , a picture may be downgraded spatially to save bitrate whenever needed. In this example, a first picture 601, denoted as K, and a second picture 602, denoted as K+1, are both at a first spatial resolution. However, a third picture 603, denoted as K+2, is downscaled to a second spatial resolution that is lower than the first resolution, to accommodate a lower bitrate. This may occur, for example, due to a decrease in the available bandwidth on a communication channel. A fourth picture 604 (K+3), a fifth picture 605 (K+4), and a sixth picture 606 (K+5) are all coded with the second (lower) spatial resolution. At a seventh picture 607 (K+6), the communication channel bandwidth improves sufficiently, and the seventh picture 607 can be coded with the first (higher) resolution that was applied to the first and second pictures 601 and 602.

In the present disclosure, pictures are reconstructed to the resolutions they are coded and saved into the DPB directly without any further upscaling and/or super-resolving. In the example shown in FIG. 6, the third, fourth, fifth, and sixth pictures 603, 604, 605, and 606 (K+2, K+3, K+4 and K+5) are all saved into the DPB with the second (lower) spatial resolution, while the first, second, and seventh pictures 601, 602, and 607 (K, K+1 and K+6) are saved into the DPB with the first (higher) resolution. In other words, pictures with the first spatial resolution in the set are stored in the decoded picture buffer directly in the first spatial resolution, and pictures with the second spatial resolution in the set are stored in the decoded picture buffer directly in the second spatial resolution. As a result, the decoded picture buffer stores pictures with different spatial resolutions. In one or more examples, the decoded picture buffer stores pictures in their native spatial resolutions based on different available bandwidths in a communication channel.

Therefore, according to the present disclosure, a reference picture list may contain pictures with different spatial resolutions. It is worth mentioning that such a feature is orthogonal to the underlying decoded reference picture marking process. For example, it can be used together with the sliding window or MMCO process in H.264/AVC. It can also be used together with the RPS and its associated reference picture list generation process in H.265/HEVC.

A major motivation for allowing different spatial resolution pictures in a reference picture list is the availability of more complex motion models in VVC. For example, with affine prediction, the zooming effect required in achieving good prediction is automatically handled when a reference picture has different spatial resolution from the current picture being coded.

In HEVC, picture width and height are signaled at the video sequence level in SPS 302 (FIG. 3) and every picture in the video sequence is assumed to have the same size. According to the present disclosure, picture width and picture height are directly and/or indirectly signaled at picture level, e.g. in PPS 304. The original video resolution may still be signaled at sequence level e.g. in SPS 302.

Such signaling may take various forms. For example, in PPS 304 the picture width and height may be signaled in terms of how many luma sample values along each dimension. Alternatively or additionally, they may also be signaled in PPS 304 as a ratio value relative to the original video picture width and height. For example, such ratio values may be ¼, ½, ¾ and 1.0 etc. These ratio values may be signaled as denominators and numerators. They may also be signaled as an index value into a set of predefined denominators and numerators.

According to the present disclosure, motion vector scaling may be based on picture resolution, in additional to picture POC differences. For example, depending on the relative ratios of picture spatial resolutions, motion vectors scaling may be adjusted accordingly.

According to the present disclosure, in situations where a reference picture has different spatial resolution from the current picture being coded, a global motion vector may be derived based on these two spatial resolutions, to address at least the zooming effect between these two pictures due to having different spatial resolutions.

For a current picture to be coded, a global motion vector may be derived for each reference picture. The motion vector decoded and/or signaled for each block in the current picture, is assumed to have been predicted using a global motion vector associated with the corresponding reference picture for the motion vector decoder and/or signaled. As a result, the actual motion vector for the current block is derived jointly from the signaled motion vector of the block and a global motion vector.

In situations where the current picture to be coded has the same spatial resolution as a reference picture, a global motion vector may not be needed for use with that reference picture.

The global motion vector may use various motion models. For example, it may use the affine motion model to convey the zooming effect between different pictures mentioned above. It may also use other motion models to convey the zooming effect.

According to the present disclosure, such a global motion vector does not have to be explicitly signaled in the bitstream to decoder. Instead, it may be derived based on a same set of rules at both the encoder end and the decoder end. The same set of rules may include at least picture spatial resolution as one of the factors in determining a global motion vector.

According to another embodiment of the present disclosure, the global motion vector for each reference picture may be signaled in bitstream to the decoder. Such signaling may also take various forms. For example, each of the global motion vectors can be signaled directly as a motion vector. Each of the global motion vectors may also be signaled as scaling ratios along horizontal and vertical dimensions. Alternatively, each of the global motion vectors be also be signaled as index values into a set of predefined motion vectors and/or scaling ratios.

According to the current disclosure, although there is no need to up-sample/down-sample a lower/higher resolution picture in the DPB to the spatial resolution of current picture, a set of filters may still be signaled to decoder to indicate the preferred picture up-sampling/down-sampling filter to be used for better motion compensation prediction or better display. Such signaling may be put in header information, or in SPS 302 and PPS 304. It may also be signaled as an SEI (supplemental enhancement information).

In some examples, the set of two or more pictures does not include any picture that supports random access.

In some examples, the second spatial resolution is less than the first spatial resolution, comprising a resolution downgrade from the first spatial resolution to the second spatial resolution, and the method further comprises downgrading the resolution in a horizontal direction only, downgrading the resolution in a vertical direction only, or downgrading the resolution in both the horizontal and vertical directions.

In some examples, the method further includes sending the coded set of two or more pictures on a communication channel having a dynamically changing bandwidth capacity, and setting the second spatial resolution to be less than the first spatial resolution in response to the bandwidth capacity of the communication channel decreasing.

In some examples, the method further includes sending the coded set of two or more pictures on a communication channel having a dynamically changing bandwidth capacity, and setting the second spatial resolution to be greater than the first spatial resolution in response to the bandwidth capacity of the communication channel increasing.

In some examples, the set of two or more pictures comprises a reference picture list containing pictures with different spatial resolutions.

In some examples, affine prediction is used to provide an enhanced zooming effect for the set of two or more pictures, wherein the reference picture list includes two or more pictures each having a different spatial resolution from a new picture that is currently being coded.

In some examples, the method further includes signaling a picture width and a picture height for each picture of the set of two or more pictures using a picture parameter set.

In some examples, the method further includes signaling the picture width and the picture height by signaling a first quantity of luma samples in a first dimension of the set of two or more pictures, and signaling a second quantity of luma samples in a second dimension of the set of two or more pictures.

In some examples, the method further includes signaling the picture width and the picture height by signaling a ratio value relative to a previous picture width and a previous picture height for the set of two or more pictures. In some examples, the ratio value is signaled as a numerator and a denominator. In some examples, the ratio value is signaled as an index value into a set of predefined numerators and denominators.

In some examples, the method further includes performing motion vector scaling, and adjusting the motion vector scaling in response to a difference between the first spatial resolution and the second spatial resolution.

In some examples, the method further includes deriving a global motion vector based upon the first spatial resolution and the second spatial resolution, to address a zooming effect between the first picture and the second picture.

In some examples, the method further includes deriving a respective global motion vector for each corresponding picture in the set of two or more pictures, the set of two or more pictures comprising a set of reference pictures; each picture in the set of two or more pictures including a plurality of blocks; and decoding a signaled motion vector for each block of the plurality of blocks of the set of two or more pictures. The signaled motion vector is predicted using the respective global motion vector associated with the corresponding picture in the set of two or more pictures. An actual motion vector for a current block of a current picture is derived jointly from the signaled motion vector and the global motion vector.

In some examples, the method further includes using an affine motion model to convey a zooming effect between the first picture and the second picture.

In some examples, the method further includes deriving each respective global motion vector at a decoder, based upon a same set of rules being applied at both the decoder and a coder. The same set of rules considers at least one of the first spatial resolution and/or the second spatial resolution.

In some examples, the method further includes signaling each respective global motion vector using a first scaling ratio along a horizontal dimension, and a second scaling ratio along a vertical dimension.

In some examples, the method further includes signaling each respective global motion vector using a set of index values that index into a set of predefined motion vectors or scaling ratios.

In some examples, the method further includes signaling the selected filter by using at least one of: header information, supplemental enhancement information, a picture parameter set, or a sequence parameter set.

In some examples, the set of two or more pictures does not include any picture that supports random access.

In some examples, the second spatial resolution is less than the first spatial resolution, comprising a resolution downgrade from the first spatial resolution to the second spatial resolution, and the apparatus is further configured for downgrading the resolution in a horizontal direction only, downgrading the resolution in a vertical direction only, or downgrading the resolution in both the horizontal and vertical directions.

In some examples, the apparatus further includes a data transmitter configured for sending the coded set of two or more pictures onto a communication channel having a dynamically changing bandwidth capacity, and configured for setting the second spatial resolution to be less than the first spatial resolution in response to the bandwidth capacity of the communication channel decreasing.

In some examples, the apparatus further includes a data transmitter configured for sending the coded set of two or more pictures on a communication channel having a dynamically changing bandwidth capacity, and configured for setting the second spatial resolution to be greater than the first spatial resolution in response to the bandwidth capacity of the communication channel increasing.

In some examples, the set of two or more pictures comprises a reference picture list containing pictures with different spatial resolutions.

In some examples, an affine prediction procedure is performed to provide an enhanced zooming effect for the set of two or more pictures, wherein the reference picture list includes two or more pictures each having a different spatial resolution from a new picture that is currently being coded.

In some examples, the apparatus further includes a transmitter configured for signaling a picture width and a picture height for each picture of the set of two or more pictures using a picture parameter set. In some examples, the transmitter is further configured for signaling the picture width and the picture height by signaling a first quantity of luma samples in a first dimension of the set of two or more pictures, and signaling a second quantity of luma samples in a second dimension of the set of two or more pictures. In some examples, the transmitter is further configured for signaling the picture width and the picture height by signaling a ratio value relative to a previous picture width and a previous picture height for the set of two or more pictures.

In some examples, the ratio value is signaled as a numerator and a denominator.

In some examples, the ratio value is signaled as an index value into a set of predefined numerators and denominators.

In some examples, the apparatus is further configured for performing motion vector scaling, and adjusting the motion vector scaling in response to a difference between the first spatial resolution and the second spatial resolution.

In some examples, the apparatus is further configured for deriving a global motion vector based upon the first spatial resolution and the second spatial resolution, to address a zooming effect between the first picture and the second picture.

In some examples, the apparatus is further configured for deriving a respective global motion vector for each corresponding picture in the set of two or more pictures, the set of two or more pictures comprising a set of reference pictures; each picture in the set of two or more pictures including a plurality of blocks; and decoding a signaled motion vector for each block of the plurality of blocks of the set of two or more pictures. The signaled motion vector is predicted using the respective global motion vector associated with the corresponding picture in the set of two or more pictures. An actual motion vector for a current block of a current picture is derived jointly from the signaled motion vector and the global motion vector.

In some examples, the apparatus is further configured for using an affine motion model to convey a zooming effect between the first picture and the second picture.

In some examples, the apparatus further includes a decoder configured for deriving each respective global motion vector, based upon a same set of rules being applied at both the decoder and a coder. The same set of rules considers at least one of the first spatial resolution or the second spatial resolution.

In some examples, the apparatus is further configured for signaling each respective global motion vector using a first scaling ratio along a horizontal dimension, and a second scaling ratio along a vertical dimension.

In some examples, the apparatus is further configured for signaling each respective global motion vector using a set of index values that index into a set of predefined motion vectors or scaling ratios.

In some examples, the apparatus is further configured for signaling the selected filter by using at least one of: header information, supplemental enhancement information, a picture parameter set, or a sequence parameter set.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the implementations described in the present application. A computer program product may include a computer-readable medium.

Further, the above methods may be implemented using an apparatus that includes one or more circuitries, which include application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components. The apparatus may use the circuitries in combination with the other hardware or software components for performing the above described methods. Each module, sub-module, unit, or sub-unit disclosed above may be implemented at least partially using the one or more circuitries.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact examples described above and illustrated in the accompanying drawings, and that various modifications and changes can be made without departing from the scope thereof. It is intended that the scope of the invention only be limited by the appended claims.

We claim:

1. A method of video encoding, comprising:
    encoding a set of two or more pictures with at least a first spatial resolution and a second spatial resolution that is different from the first spatial resolution;
    reconstructing the coded set of two or more pictures and storing the reconstructed set of two or more pictures in a picture buffer based on corresponding spatial resolutions;
    obtaining a reference picture list comprising reconstructed pictures in at least the first spatial resolution and the second spatial resolution of the reconstructed set stored in the picture buffer;
    predicting a picture that is subsequent to the set of two or more pictures based on the reference picture list without changing the corresponding spatial resolutions of the respective reconstructed pictures when a spatial resolution of the picture is different from a spatial resolution of a respective reconstructed picture to be used for predicting the picture; and
    signaling a picture width and a picture height for each picture of the set of two or more pictures using a picture parameter set (PPS);
    wherein the picture that is subsequent to the set of two or more pictures comprises a current picture to be coded with a third spatial resolution based on a reconstructed picture of the reference picture list, and wherein a ratio is determined based on the third spatial resolution and a spatial resolution of the reconstructed picture for coding the current picture.

2. The method of claim 1, wherein the second spatial resolution is less than the first spatial resolution, comprising a resolution downgrade from the first spatial resolution to the second spatial resolution, and the method further comprises downgrading the resolution in a horizontal direction only, downgrading the resolution in a vertical direction only, or downgrading the resolution in both the horizontal and vertical directions.

3. The method of claim 1, wherein the signaling further comprises signaling a first quantity of luma samples in a first dimension of the set of two or more pictures, and signaling a second quantity of luma samples in a second dimension of the set of two or more pictures.

4. An apparatus for video encoding, comprising:
an encoder configured for encoding a set of two or more pictures with at least a first spatial resolution and a second spatial resolution that is different from the first spatial resolution;
a decoder configured for reconstructing the coded set of two or more pictures; and
a picture buffer configured for storing the reconstructed set of two or more pictures based on corresponding spatial resolutions;
wherein the encoder is configured to obtain a reference picture list comprising reconstructed pictures in at least the first spatial resolution and the second spatial resolution of the reconstructed set stored in the picture buffer, and predict a picture that is subsequent to the set of two or more pictures based on the reference picture list without changing the corresponding spatial resolutions of the respective reconstructed pictures when a spatial resolution of the picture is different from a spatial resolution of a respective reconstructed picture to be used for predicting the picture;
wherein the encoder is further configured for signaling a picture width and a picture height for each picture of the set of two or more pictures using a picture parameter set (PPS); and
wherein the picture that is subsequent to the set of two or more pictures comprises a current picture to be coded with a third spatial resolution based on a reconstructed picture of the reference picture list, and wherein a ratio is determined based on the third spatial resolution and a spatial resolution of the reconstructed picture for coding the current picture.

5. The apparatus of claim 4, wherein the second spatial resolution is less than the first spatial resolution, comprising a resolution downgrade from the first spatial resolution to the second spatial resolution, and the apparatus is further configured for downgrading the resolution in a horizontal direction only, downgrading the resolution in a vertical direction only, or downgrading the resolution in both the horizontal and vertical directions.

6. The apparatus of claim 4, wherein the encoder is further configured for signaling a first quantity of luma samples in a first dimension of the set of two or more pictures, and signaling a second quantity of luma samples in a second dimension of the set of two or more pictures.

7. A non-transitory computer-readable medium storing computer-executable instructions that, when executed by one or more computer processors, cause the one or more computer processors to perform acts to encode the current video block into a bitstream and transmit the bitstream, the acts comprising:
encoding a set of two or more pictures with at least a first spatial resolution and a second spatial resolution that is different from the first spatial resolution;
reconstructing the coded set of two or more pictures and storing the reconstructed set of two or more pictures in a picture buffer based on corresponding spatial resolutions;
obtaining a reference picture list comprising reconstructed pictures in at least the first spatial resolution and the second spatial resolution of the reconstructed set stored in the picture buffer;
predicting a picture that is subsequent to the set of two or more pictures based on the reference picture list without changing the corresponding spatial resolutions of the respective reconstructed pictures when a spatial resolution of the picture is different from a spatial resolution of a respective reconstructed picture to be used for predicting the picture; and
signaling a picture width and a picture height for each picture of the set of two or more pictures using a picture parameter set (PPS);
wherein the picture that is subsequent to the set of two or more pictures comprises a current picture to be coded with a third spatial resolution based on a reconstructed picture of the reference picture list, and wherein a ratio is determined based on the third spatial resolution and a spatial resolution of the reconstructed picture for coding the current picture.

\* \* \* \* \*